(12) United States Patent
Burrows et al.

(10) Patent No.: US 7,661,660 B2
(45) Date of Patent: Feb. 16, 2010

(54) METHOD AND APPARATUS FOR AERATION OF A FLUID

(75) Inventors: Harvey P. Burrows, Greeley, CO (US); Matthew G. Burrows, Greeley, CO (US); Richard D. Helzer, Greeley, CO (US); David K. Berens, Windsor, CO (US)

(73) Assignee: Fisher Pumps, Inc., Greeley, CO (US)

( * ) Notice: Subject to any disclaimer, the term of this patent is extended or adjusted under 35 U.S.C. 154(b) by 328 days.

(21) Appl. No.: 11/325,217

(22) Filed: Jan. 3, 2006

(65) Prior Publication Data

US 2006/0151385 A1 Jul. 13, 2006

Related U.S. Application Data

(60) Provisional application No. 60/642,281, filed on Jan. 6, 2005.

(51) Int. Cl.
*B01F 3/04* (2006.01)
(52) U.S. Cl. .......................................... 261/91; 261/93
(58) Field of Classification Search .................. 261/91, 261/93, DIG. 70, DIG. 71, DIG. 75
See application file for complete search history.

(56) References Cited

U.S. PATENT DOCUMENTS

| | | | | |
|---|---|---|---|---|
| 2,280,979 A | * | 4/1942 | Rocke | 261/36.1 |
| 3,365,178 A | * | 1/1968 | Bood | 261/25 |
| 3,521,864 A | | 7/1970 | Welles, Jr. | |
| 3,572,658 A | * | 3/1971 | Ravitts | 261/36.1 |
| 3,846,516 A | | 11/1974 | Carlson | |
| 3,984,001 A | | 10/1976 | Nagano et al. | |
| 4,133,850 A | | 1/1979 | Hauser | |
| 4,140,737 A | | 2/1979 | Hauser | |
| 4,265,739 A | | 5/1981 | Dalton | |
| 4,437,765 A | | 3/1984 | Seeger | |
| 4,465,645 A | | 8/1984 | Kaelin | |
| 4,650,577 A | | 3/1987 | Hansel | |
| 4,681,711 A | | 7/1987 | Eaton | |
| 4,707,308 A | | 11/1987 | Ryall | |
| 4,780,217 A | | 10/1988 | Petersen | |
| 4,917,577 A | * | 4/1990 | Stirling | 417/66 |
| 5,057,230 A | * | 10/1991 | Race | 210/758 |
| 5,169,293 A | * | 12/1992 | Yamamoto | 417/179 |
| 5,275,762 A | | 1/1994 | Burgess | |
| 5,403,522 A | * | 4/1995 | Von Berg | 261/36.1 |
| 5,500,135 A | | 3/1996 | Smith et al. | |
| 5,527,475 A | | 6/1996 | Smith et al. | |
| 5,591,348 A | | 1/1997 | Felder et al. | |
| 5,925,290 A | * | 7/1999 | Hills | 261/36.1 |
| 5,996,977 A | | 12/1999 | Burgess | |
| 6,241,897 B1 | * | 6/2001 | Hanson et al. | 210/739 |

(Continued)

*Primary Examiner*—Scott Bushey
(74) *Attorney, Agent, or Firm*—William W. Cochran; Paul M. Thompson; Cochran Freund & Young LLC

(57) ABSTRACT

Disclosed are a method and system for providing improved aeration of a fluid that is propelled though a pump to efficiently transfer oxygen and other gasses to a liquid body. In addition to the aeration, circulation of the liquid body may be performed to provide additional efficiency and benefit to the fluid system. In one embodiment, the apparatus performs efficient aeration by utilizing a venturi effect on the submerged intake manifold of a floating centrifugal pump. The aerated fluid is then directed to circulate the aerated liquid to a portion of the fluid body that is in greatest need of the gas that is being mixed with the fluid.

14 Claims, 4 Drawing Sheets

U.S. PATENT DOCUMENTS 6,394,423 B1 * 5/2002 Vento .......................... 261/29
6,719,911 B2    4/2004 Bourke
6,736,377 B1    5/2004 Chien
2004/0089595 A1 5/2004 Kujawa

* cited by examiner

US 7,661,660 B2

METHOD AND APPARATUS FOR AERATION OF A FLUID

CROSS REFERENCE TO RELATED APPLICATIONS

This application is based upon and claims the benefit of U.S. provisional application No. 60/642,281, entitled "Method and Apparatus for Aeration of a Fluid", filed Jan. 6, 2005, the entire disclosure of which is hereby specifically incorporated by reference for all that it discloses and teaches.

BACKGROUND OF THE INVENTION a. Field of the Invention

The present invention relates generally to a method and apparatus for aeration of a fluid and more specifically to the aeration of a fluid that is propelled though a pump to efficiently transfer oxygen and other gasses to a liquid body.

b. Description of the Background

The process of adding air to water has been widely used in the treatment of industrial and hazardous waste, sewage, wastewater and a variety of applications where it is desirable to increase the gas content of a liquid body. Typically this is performed with the aid of air diffusion units (bubblers), surface aeration units that generate liquid spray or high surface turbulence, or submerged aeration systems which can constitute an immersed hybrid of the two.

SUMMARY OF THE INVENTION

The present invention overcomes the disadvantages and limitations of the prior art by providing improved aeration of a fluid that is propelled through a pump to efficiently transfer oxygen and other gasses to a fluid and circulate the fluid through a liquid body.

An embodiment of the present invention may therefore comprise an apparatus for providing aeration to a fluid that is propelled though a rotationally driven pump comprising: an air manifold attached proximate to a pump intake of the rotationally driven pump comprising: a gas supply in communication with the air manifold; a fluid intake for supplying fluid to the air manifold; and, a vortex chamber within the manifold that substantially surrounds the fluid intake and circumferentially draws gas into the fluid as a result of a pressure drop created by flow of the fluid through the air manifold.

An embodiment of the present invention may also comprise an apparatus for providing flow and aeration of a fluid comprising: a rotationally driven pump; a pump manifold that surrounds a pump turbine and provides propulsion of the fluid from a pump intake to an outlet manifold when the pump turbine is rotated about an axis; an air manifold attached proximate to the pump intake of the rotationally driven pump comprising: a gas supply in communication with the air manifold; a fluid intake for supplying fluid to the air manifold; and, a vortex chamber within the manifold that substantially surrounds the fluid intake and circumferentially draws gas into the fluid as a result of a pressure drop created by flow of the fluid through the air manifold.

An embodiment of the present invention may additionally comprise a method of providing flow and aeration to a fluid comprising: rotating a pump turbine that is surrounded by a pump manifold to provide propulsion of the fluid from a pump intake to an outlet manifold; receiving a gas with an air manifold that is attached proximate to the pump intake; receiving the fluid with the air manifold through a fluid intake; circumferentially drawing the gas into the fluid as a result of a pressure drop created by flow of the fluid through the air manifold and creating an aerated fluid; receiving the aerated fluid with the pump intake; and, propelling the aerated fluid with the pump turbine.

DETAILED DESCRIPTION OF THE INVENTION

Figure 1:
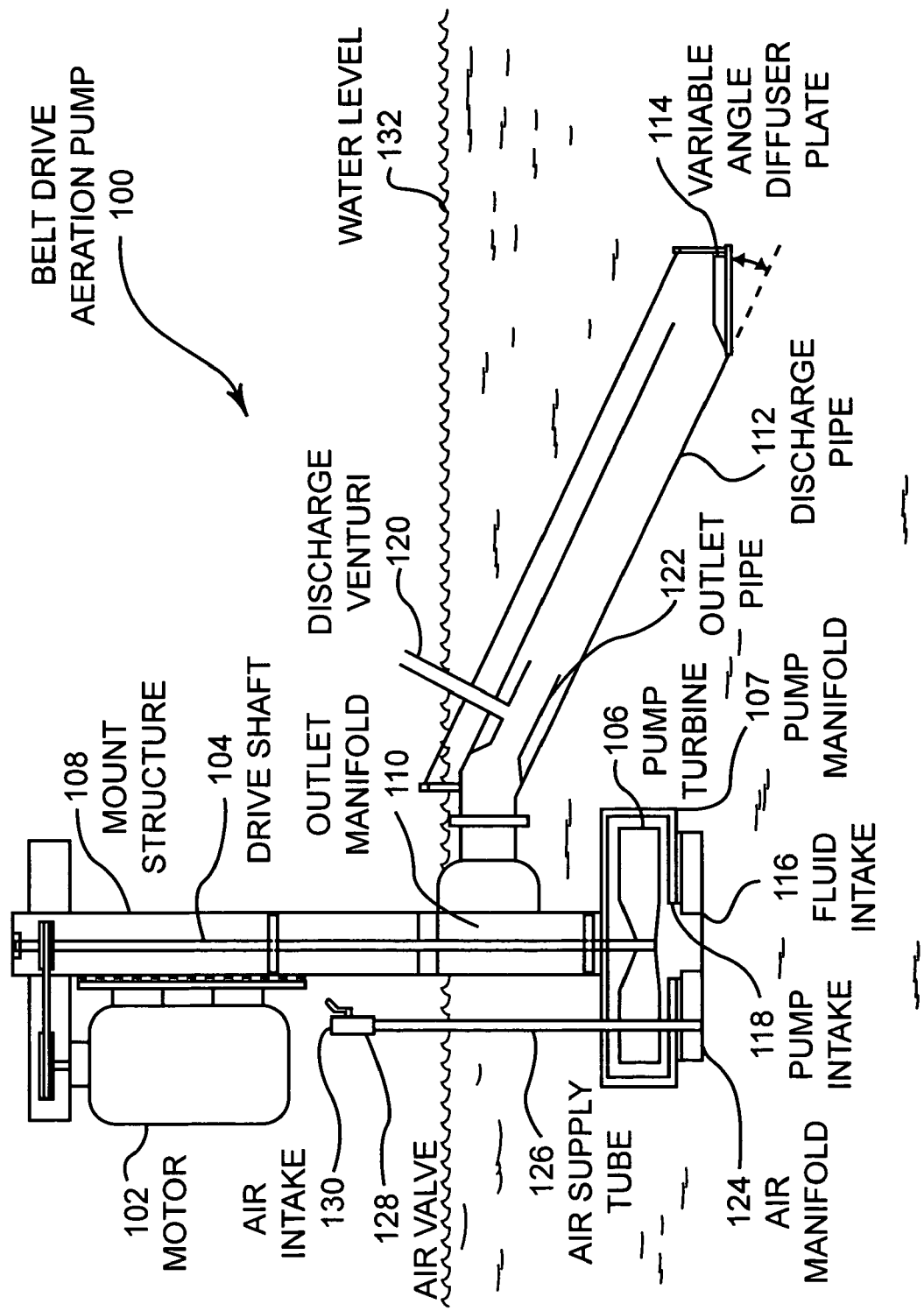
FIG. 1 illustrates an embodiment of a belt driven aeration pump.

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

The described apparatus provides improved aeration of a fluid that is propelled through a rotationally driven pump (such as a centrifugal pump or a turbine pump, a generic impeller pump or the like) to efficiently transfer oxygen and other gasses to a liquid body. This is accomplished in a manner whereby gas is introduced in relatively large volumes from substantially 360 degrees about the axis of the pump turbine or centrifugal blades and by the rotational spin that can be developed in the incoming gas in the air manifold before it is drawn into the fluid vortex. Aeration is enhanced by the structural arrangement of having the circumference of the inlet for the fluid stream into the air manifold being smaller than the circumference of the inlet to the pump manifold just above it. By directing the incoming water vortex and mixed gas to the pump centrally along the vertical axis of the turbine or centrifugally rotating blades, the strength of the vortex is increased, thereby increasing the volume of air/gas being drawn into the fluid stream. By introducing a large amount of gas into the fluid stream prior to reaching the pumping mechanism, the gas is thoroughly mixed and disbursed in fine bubbles within the fluid by the rapidly rotating turbine or impeller vane. In addition to the aeration, circulation of the liquid body may be performed to provide additional efficiency and benefit to the fluid system. In one embodiment, the apparatus performs efficient aeration by utilizing a venturi effect on the submerged intake manifold of a floating centrifugal pump. The aerated fluid is then directed to circulate the aerated liquid to a portion of the fluid body that is in greatest need of the gas that is being mixed with the fluid.

As illustrated in FIG. 1, an embodiment of a belt driven aeration pump 100 is detailed. The disclosed embodiment shows a motor 102 that is supported by a mount structure 108 and fitted to rotate a drive shaft 104. The drive shaft 104 is connected to a pump turbine 106 (or impeller vane) such that when the motor 102 is operating, the pump turbine 106 is rotating within a pump manifold 107. As within a conventional pump system, fluid is drawn into the pump turbine 106 and forced upward into an outlet manifold 110 and exits the pump section through an outlet pipe 122. In the disclosed embodiment, an air manifold 124 is attached to the outer surface of the pump manifold 107 at the pump intake 118.

This air manifold 124 covers the pump intake 118 and forms a fluid intake 116 on the underside of the pump manifold 107 so that the pump intake 118 receives fluid after it passes through a fluid intake 116 which is located in the center of the inferior-most portion of the air manifold 124.

As the motor 102 transfers power to rotate the drive shaft 104 and the pump turbine 106 or impeller, fluid is forced from within the pump manifold 107 upwards through the outlet manifold 110 and out through the outlet pipe 112. As the fluid is pumped out of the pump manifold 107, a large pressure drop is created and fluid rushes through the fluid intake 116 past the air manifold 124 and through the pump intake 118. As the fluid passes through the air manifold 124, air/gas is drawn into the liquid by a venturi effect. Because the diameter of the fluid intake 116 is sized to be smaller in diameter than the pump intake 118, the outer restricted inlet produces a drop in pressure, causing air/gas to be drawn out of the air manifold 124 and disbursed within the liquid as it rapidly flows by the manifold. Additional air/gas is supplied to the air manifold 124 by an air supply tube 126 that receives the air/gas from an air intake 130. The amount of air/gas that is supplied to the air manifold can be regulated with an air valve 128.

As the initially aerated fluid exits through the outlet pipe 122, a secondary aeration can be performed. This can be accomplished with a discharge venturi 120 that is placed in an orthogonal manner to the outlet pipe 122 and such that the restricted inlet produces a drop in pressure, causing air/gas to be drawn from the discharge venturi 120 and disbursed within the outlet liquid as it flows by. The outlet pipe 122 is encased within a larger diameter discharge pipe 112 that directs aerated liquid flow away from the pump. The discharge tube 112 is typically angled downward, and may contain a variable angle diffuser plate 114 to direct the flow of the liquid at a desired angle and in a desired direction.

Figure 2:
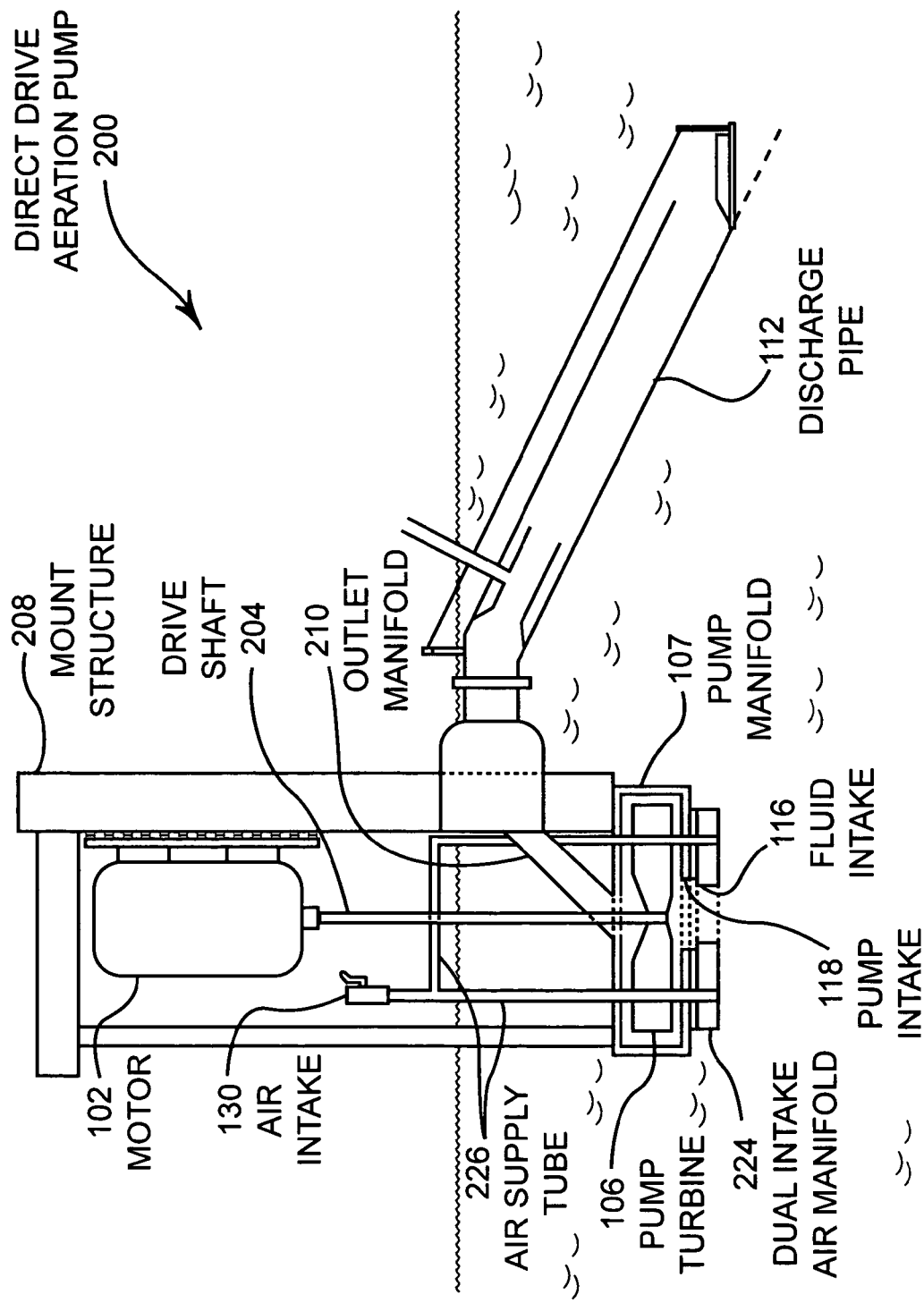
FIG. 2 illustrates an embodiment of a direct drive aeration pump.

As illustrated in FIG. 2, an embodiment of a direct drive aeration pump 200 is detailed. The disclosed embodiment shows, in a similar manner to FIG. 1, a pump turbine 106 or vane arrangement rotated by a motor 102 through a direct connection through a drive shaft 204. This arrangement draws fluid up into the pump manifold 107 where the vanes then pump it out through an outlet manifold 210 and out through a discharge pipe 112. The outlet manifold 210 (and 110 in FIG. 1) may comprise a single outlet connection or multiple connections from the pump manifold 107 to the discharge pipe 112. A double or multiple discharge from the pump manifold 107 acts to equalize the pressure within the manifold and reduce bearing wear within the drive mechanism of the pump.

Typically, when attempting to aerate a body of water with ambient air using conventional methods, the liquid is drawn into a pump and the water is sprinkled or sprayed onto the surface of the body of water from an outlet. Air/oxygen is added to the liquid in this process, but very inefficiently and in small amounts. Additionally, mixing of the water and air/oxygen is not accomplished in significant amounts by spraying techniques as the wastewater tends to stay in large droplets and not mix with the ambient air. If too fine a spray is created, then the water (typically wastewater) sends pollutants/waste into the atmosphere without being aerobically treated. In addition to the inefficiency and the high rate of water loss due to evaporation and dispersal, the smell can be quite intense.

By utilizing the embodiment disclosed in FIG. 2, liquid is drawn into the pump intake 118 and enters the pump manifold 107 through the fluid intake 116, the water passes through the dual intake air manifold 224. As water flows through this arrangement, a vortex is created by the rotating pump turbine 107 (or centrifugal impeller blades) at a centrally located fluid intake 116. As the water enters the dual intake air manifold, the pressure drop causes atmospheric air/oxygen to be drawn downwardly through the air intake 130 into the water vortex. In this turbulent flow, the air is thoroughly mixed with the water as it enters the pump manifold 107. The air manifold 124 would preferably surround the incoming, pre-entrance vortex so that air/oxygen was added completely around the vortex (from all sides or 360 degrees). The vanes of the pump turbine 106 then act to break-up, diffuse and disperse the air bubbles within the fluid stream. In this manner air/oxygen can be added to the water in great amounts as it is being drawn up and pumped to the surface of the body of water. This aids the aerobic process in the circulating upper few feet of the body of water. It also greatly lowers the density of the liquid being pumped up (because of the added air) so the driving motor 102 can operate at lower horsepower.

Figure 3:
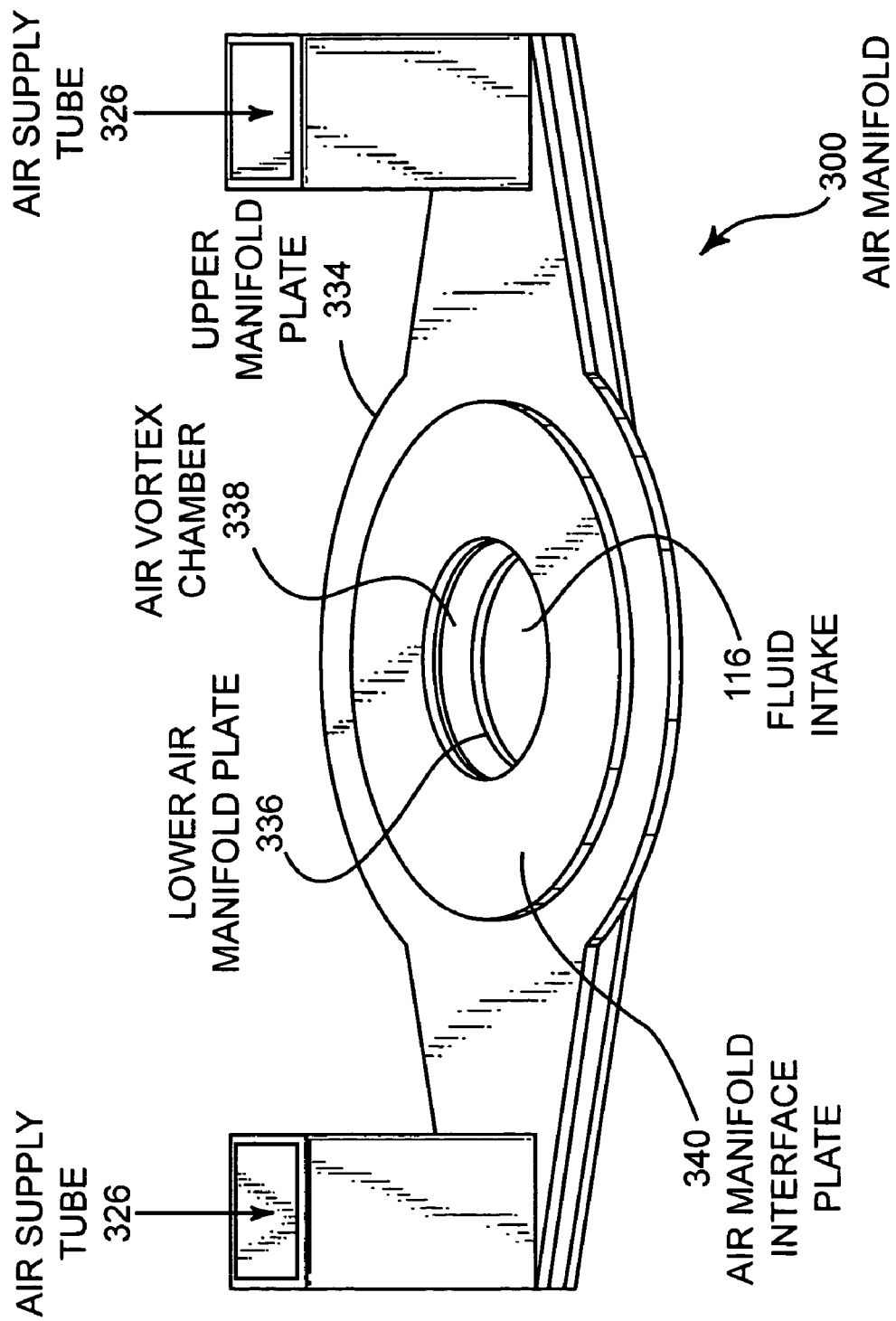
FIG. 3 illustrates an embodiment of a dual supply air manifold for an aeration pump as illustrated in FIG. 1 or FIG. 2.

Illustrated in FIG. 3 is an embodiment of a dual supply air manifold 300 for an aeration pump as may be utilized in embodiments described in FIG. 1 or FIG. 2. As detailed in FIG. 3, the air manifold 300 is comprised of an upper manifold plate 334 and a lower air manifold plate 336 that are fixed substantially coplanar and spaced a distance apart to form an air gap between the two inner surfaces. The perimeter walls are typically substantially sealed to form an enclosure or air vortex chamber 338. This allows air to swirl around the fluid flowing through the fluid intake 116 and direct air to the center of the air manifold 300 from the perimeter in a circumferential manner. Air is therefore drawn circumferentially (from the perimeter of the cylinder of fluid towards the center axis) into the fluid flowing through air manifold 300 by a pressure drop the fluid experiences by flowing from a smaller (cross sectional area) sized fluid intake 116 to a larger size pump intake 118. One or more air supply tubes 326 (two shown in this embodiment) are connected to the enclosure to provide gas/air to the air vortex chamber 338 from a supply such as environmental air above the surface of a body of water or a pressurized gas source. As shown in FIG. 3, the upper manifold plate 334 and the lower manifold plate 336 contain a circular opening that acts as a fluid intake 116 for the air manifold 300. An air manifold interface plate 340 is connected to the outer surface of the upper manifold plate 334 and contains a similar opening that matches the fluid intake 116. The air manifold interface plate 340 allows connection to the pump manifold 107 (shown in FIG. 1), and aligns such that the fluid intake 116 is substantially coaxial with a pump intake 118 of FIG. 1.

When the air manifold 300 is positioned on the inlet of a fluid pump, a strong vortex is created in the vicinity of the fluid intake 116 by the rotating impeller. Since the opening within the air manifold 300 is sized to be smaller in diameter than a pump inlet opening, a negative pressure is also created in the area between these openings. This vortex passes through the openings of the air manifold 300 and into the pump intake 118 (FIG. 1) where a strong swirl of flow past the air vortex chamber 338 in the region of negative pressure combines to form a venturi that draws air/gas from the air supply tube into the fluid vortex. The design of the air manifold 300 is such that air/gas can be drawn in from multiple/all sides of the turbine axis so that air/oxygen is added completely around the vortex.

The fluid dynamics in such an environment cause an air vortex to occur within the air vortex chamber 338 and large quantities of air are drawn into the liquid stream from all sides or 360 degrees. The swirling effect of the air and fluid vortexes provide abundant mixing of the two mediums prior to being drawn into the impellers where further mixing and diffusion occur as the air/liquid mixture is subjected to rapid contact with the impeller blades and additional turbulence.

The upper manifold plate 334 is used as an access point for the air supply tubes 326 that bring air/gas to the enclosure from opposite sides and supply the air vortex chamber 338. By placing more than one supply tube and spacing the tubes evenly and oppositely about the turbine axis, a greater air vortex is created and greater quantities of air/gas can be introduced into the liquid. In addition to using atmospheric air to feed the air intake of the system, various pressurized gasses or even liquids may be supplied to the air supply tubes 326. For example, pressurized or non-pressurized chlorine gas or liquid may be supplied and drawn into the fluid stream by the air manifold 300 to provide a disinfection pump and can be used to create potable water.

Figure 4:
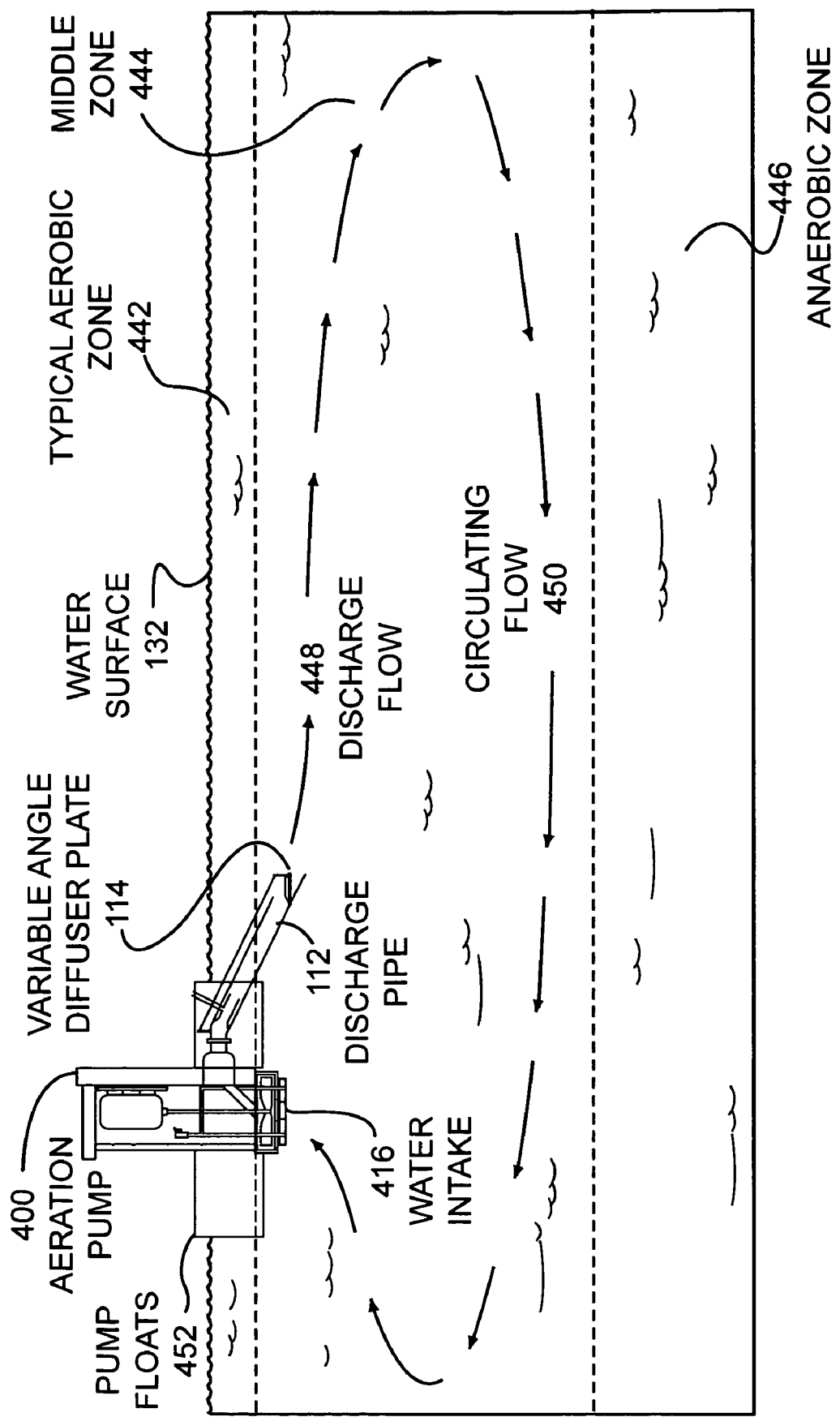
FIG. 4 illustrates an embodiment of an aeration pump utilized to aerate a typical fluid body.

As illustrated in FIG. 4, an embodiment of an aeration pump 400 utilized to aerate and circulate a body of water is detailed. In a typical application for aeration of a body of water might be lagoon aeration, irrigation recovery ponds, flush water for free stalls in dairy applications, cellar pumps for oilfield drilling fluids, fishery and aquaculture applications, petrochemical and chemical fluid treatment and the like, where a contained body of water is in need not only of oxygenation, but also can benefit from circulation. Using the example of treatment within a wastewater lagoon, a floating centrifugal aeration pump 400 can be utilized to provide aeration and circulation. In a conventional wastewater lagoon environment (e.g., five acres), the pond may be 10 feet deep with an aerobic section in the upper two feet, an anaerobic section in the lower 4 feet, and with a middle section therebetween.

A typical aerobic zone 142 is the region of the pond where aerobic bacteria and microorganisms provide breakdown of wastes utilizing oxygen derived from the surface interaction of the water with the atmosphere. The depth of this zone is limited due to the lack of circulation and mixing that occurs between the air and water. An anaerobic zone 146 is the region of the pond where anaerobic bacteria and microorganisms provide breakdown of wastes. Both aerobic and anaerobic processes are beneficial to the overall treatment of the body of water but it is typically the anaerobic processes that are the source of the smell associated with such treatment environments.

The embodiment described in FIG. 4 utilizes an aeration pump 400 such as described in FIGS. 1 and 2 that is attached to pontoons or pump floats 452 that are positioned to allow intake of the water at a predetermined water level with the water intake 416 while positioning the air supply intakes (130 and 120 of FIG. 1) well above the water surface 132. The discharge pipe 112 may be of variable length and positioned at various levels under the water surface 132 and the actual water discharge angle flowing out of the discharge pipe 112 can be varied with a device such as variable angle diffuser plate 114.

In a typical application as described above, the pump of interest floats on a pond and brings up wastewater from a few feet under the surface and creates a discharge flow 448 of aerated water. By adjusting the angle and length of the discharge pipe 112 and setting the angle of discharge of the aerated fluid with the variable angle diffuser plate 114, a circulating flow 450 is established out to the edges of the pond and back. This circulating flow 450 may be established in a variety of depths or regions depending upon the application. The circulating flow 450 may be limited to the typical aerobic zone 142 or made to also encompass middle zone 450 or the anaerobic zone 446 of the pond if such a demand arises. Multiple aeration pump systems can also be designed using these principals thereby customizing particular applications to the environmental conditions that may be found in a fluid treatment situation.

The embodiments detailed above, offer numerous advantages over traditional systems in the manner in which air/gas is added upstream of the impeller blades. In particular, by introducing the air/oxygen in relatively large volumes substantially 360 degrees about the axis of the impeller a greater amount of gas can be introduced to the fluid stream. The rotational spin that is developed within the incoming air/oxygen in the air manifold before it is drawn into the fluid vortex created greater mixing of fluid and gas and the inlet circumference of the air manifold being smaller than the circumference of the inlet to the pump manifold strengthens the vortex and enhance the volume of air/oxygen being drawn into the fluid. Additionally, the embodiments described offer the ability to vertically section and/or direct the circulating flow of highly aerated water in a contained body of water that can greatly increase the effective treatment efficiency of the system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. An apparatus for providing flow and aeration of a body of water comprising:
   a rotationally driven pump positioned above the surface of said body of water that drives a generally vertically oriented pump turbine that is submerged within said body of water;
   a pump manifold that surrounds said pump turbine and provides upward propulsion of a stream of fluid from said body of water from a pump intake located below said pump turbine to an outlet manifold located above said pump turbine when said pump turbine is rotated about an axis;
   an air manifold attached proximate to said pump intake of said rotationally driven pump comprising:
      a gas supply in communication with said air manifold;
      a fluid intake for supplying fluid to said air manifold, said fluid intake opening that is smaller in cross sectional area and coaxial with said pump intake; and,
      a vortex chamber within said manifold that substantially surrounds said fluid intake and circumferentially draws gas into said fluid as a result of a pressure drop created by flow of said fluid through said air manifold;
   a discharge pipe that directs the output of said rotationally driven pump at an angle below the surface of said body of water to provide mixing of said body of water.

2. The apparatus of claim 1 wherein said rotationally driven pump is powered by an electric motor.

3. The apparatus of claim 1 wherein said rotationally driven pump is powered by an internal combustion motor.

4. The apparatus of claim 1 wherein said communication between said gas supply and said air manifold is performed with at least one air supply tube.

5. The apparatus of claim 4 wherein said at least one air supply tube further comprises:
 a valve for regulating the amount of said gas delivered to said air manifold.

6. The apparatus of claim 1 wherein said gas supply is ambient air.

7. The apparatus of claim 1 wherein said gas supply is a pressurized gas.

8. The apparatus of claim 1 wherein said gas supply chemically reacts with said fluid to change the physical properties of said fluid.

9. The apparatus of claim 8 wherein said gas supply provides a disinfecting agent to said fluid.

10. The apparatus of claim 9 wherein said gas supply provides algaecide to said fluid.

11. The apparatus of claim 9 wherein said gas supply provides an odor controlling agent to said fluid.

12. The apparatus of claim 1 wherein said discharge pipe further comprises:
 a diffuser plate located at the distal portion of said discharge pipe to further direct flow of said output of said rotationally driven pump.

13. The apparatus of claim 1 wherein said discharge pipe further comprises:
 a discharge venturi that further aerates said output of said rotationally driven pump.

14. An apparatus for providing flow and aeration of a body of water comprising:
 a rotationally driven pump positioned above the surface of said body of water that drives a generally vertically oriented pump turbine that is submerged within said body of water;
 a pump manifold that surrounds said pump turbine and provides upward propulsion of a stream of fluid from said body of water from a pump intake located below said pump turbine to an outlet manifold located above said pump turbine when said pump turbine is rotated about an axis;
 an air manifold attached proximate to said pump intake of said rotationally driven pump comprising:
  a gas supply comprising at least one regulated air supply tube in communication with said air manifold;
  a fluid intake for supplying fluid to said air manifold, said fluid intake opening that is smaller in cross sectional area and coaxial with said pump intake; and,
  a vortex chamber within said manifold that substantially surrounds said fluid intake and circumferentially draws gas into said fluid as a result of a pressure drop created by flow of said fluid through said air manifold;
 a discharge pipe that directs the output of said rotationally driven pump at an angle below the surface of said body of water to provide mixing of said body of water;
 a diffuser plate located at the distal portion of said discharge pipe to further direct flow of said output of said rotationally driven pump; and,
 a discharge venturi that further aerates said output of said rotationally driven pump.

* * * * *